United States Patent
Kim et al.

(10) Patent No.: US 7,587,172 B2
(45) Date of Patent: Sep. 8, 2009

(54) BEAM AND POWER ALLOCATION METHOD FOR MIMO COMMUNICATION SYSTEM

(75) Inventors: Ho-Jin Kim, Seoul (KR); Sung-Jin Kim, Suwon-si (KR); Kwang-Bok Lee, Seoul (KR); Jianjun Li, Yongin-si (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 547 days.

(21) Appl. No.: 11/368,726

(22) Filed: Mar. 6, 2006

(65) Prior Publication Data

US 2006/0209980 A1    Sep. 21, 2006

Related U.S. Application Data

(60) Provisional application No. 60/658,550, filed on Mar. 4, 2005.

(51) Int. Cl.
*H04B 1/00* (2006.01)
*H04B 15/00* (2006.01)

(52) U.S. Cl. .................... 455/63.1; 455/450; 455/562.1

(58) Field of Classification Search ................ 455/63.1, 455/450, 562.1; 370/338, 208; 375/299, 375/285, 295
See application file for complete search history.

(56) References Cited

U.S. PATENT DOCUMENTS

| 7,009,931 | B2 * | 3/2006 | Ma et al. ..................... 370/208 |
| 7,079,586 | B1 * | 7/2006 | Adireddy et al. ............ 375/285 |
| 7,242,727 | B2 * | 7/2007 | Liu et al. ..................... 375/295 |
| 7,327,983 | B2 * | 2/2008 | Mehta et al. ................ 455/63.1 |
| 2004/0136349 | A1 * | 7/2004 | Walton et al. ............... 370/338 |
| 2005/0032521 | A1 * | 2/2005 | Lee et al. ..................... 455/450 |
| 2006/0018402 | A1 * | 1/2006 | Mehta et al. ................ 375/299 |

* cited by examiner

*Primary Examiner*—Edward Urban
*Assistant Examiner*—Christian A Hannon
(74) *Attorney, Agent, or Firm*—The Farrell Law Firm, LLP

(57) ABSTRACT

The present invention provides the multiuser Multiple-Input Multiple-Output (MIMO) systems with a feedback method which includes measuring, at the terminal, received Signal to Noise Ratios (SNRs) for all transmit antennas, selecting one of precoding matrixes, which has best SNRs, retrieving an index mapped to the selected preceding matrix from a predetermined mapping table, and transmitting the index with the SNRs of the selected precoding matrix. In the present invention, it is possible to reduce feedback information amount without degradation of the sum rate performance of the system since the feedback information is transmitted in a form of index implying appropriate precoding matrix and corresponding SNRs.

11 Claims, 3 Drawing Sheets

BEAM AND POWER ALLOCATION METHOD FOR MIMO COMMUNICATION SYSTEM

PRIORITY

This application claims priority under 35 U.S.C. § 119 to a provisional application entitled "Feedback Signaling Scheme For Multi-User MIMO With Precoding" filed in the United States Patent and Trademark Office on Mar. 4, 2005 and assigned Ser. No. 60/658,550, the contents of which are incorporated herein by reference.

BACKGROUND OF THE INVENTION

1. Field of the Invention

The present invention relates generally to a Multiple-Input Multiple-Output (MIMO) communication system and more particularly to a feedback method for multiuser MIMO communication system.

2. Description of the Related Art

Multiple-Input Multiple-Output (MIMO) systems have been one of key techniques to achieve high rate and high reliability over wireless channels. Channel information can be exploited at the transmitter if feedback channel is available. In practical systems, the limited feedback channel capacity is allowed and in a multiuser channel environment the design methodology of exploiting the partial channel knowledge at the transmitter is necessary. Recently, multiuser diversity has been investigated for high data throughput in multiuser communications, where a packet is scheduled to a user who has the highest instantaneous Signal-to-Noise Ratio (SNR). Prior work on multiuser diversity did not consider the full exploitation of user diversity when each transmit antenna is assigned for different users. Thus, in multiuser MIMO systems the limited feedback information and user diversity should be considered at the same time to design transmit preprocessing techniques (i.e. transmit precoding).

However, previous precoder design researchers have been focused on a point-to-point communication, and hence user scheduling has been separately dealt with. Accordingly, it is required to implement a finite rate feedback scheme for a multiuser MIMO transmission in consideration of user selection diversity.

SUMMARY OF THE INVENTION

The present invention has been made in an effort to solve the above and other problems occurring in conventional systems, and it is an object of the present invention to provide a finite feedback method for a multiuser MIMO communication system, which is capable of reducing feedback information amount without degrading the sum rate performance of the system.

The above object is achieved in multiuser Multiple-Input Multiple-Output (MIMO) systems in which a base station performs scheduling on the basis of feedback information received from a plurality of terminals.

In one aspect of the present invention, a data transmission method includes determining, at the base station, at least one best terminal for each transmit antenna on the basis of the feedback information, calculating a sum rate from the feedback information, deciding a precoding matrix and terminals for each transmit antenna, which maximizing the sum rate, and performing transmission with the decided precoding matrix and terminals.

In another aspect of the present invention, a method for feeding back information in multiuser Multiple-Input Multiple-Output (MIMO) system includes measuring, at the terminal, received SNRs for all transmit antennas, selecting one of precoding matrixes, which has best SNRs, retrieving an index mapped to the selected precoding matrix from a predetermined mapping table, and transmitting the index with the SNRs of the selected precoding matrix.

In another aspect of the present invention, a method for feeding back information of multiuser Multiple-Input Multiple-Output (MIMO) system includes measuring, at the terminal, received SNRs for all transmit antennas, selecting one of preceding matrixes, which has best SNRs, extracting one of column vectors constituting the selected preceding matrix, retrieving an index mapped to the selected precoding matrix from a predetermined mapping table, transmitting the index with information on the retrieved column vector and the SNRs corresponding to the column vector to the base station.

In another aspect of the present invention, a method for feeding back information of multiuser Multiple-Input Multiple-Output (MIMO) system includes measuring, at the terminal, received SNRs for all transmit antennas, selecting one of precoding matrixes, which having best SNRs, extracting one of column vectors constituting the selected precoding matrix, retrieving an index mapped to the selected precoding matrix, column vector, and SNR corresponding to the column vector of the selected precoding matrix from a predetermined mapping table, transmitting the index as the feedback information to the base station.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Preferred embodiments of the present invention will be described in detail hereinafter with reference to the accompanying drawings. In the following description of the present invention, a detailed description of known functions and configurations incorporated herein will be omitted when it may obscure the subject matter of the present invention.

Figure 1:
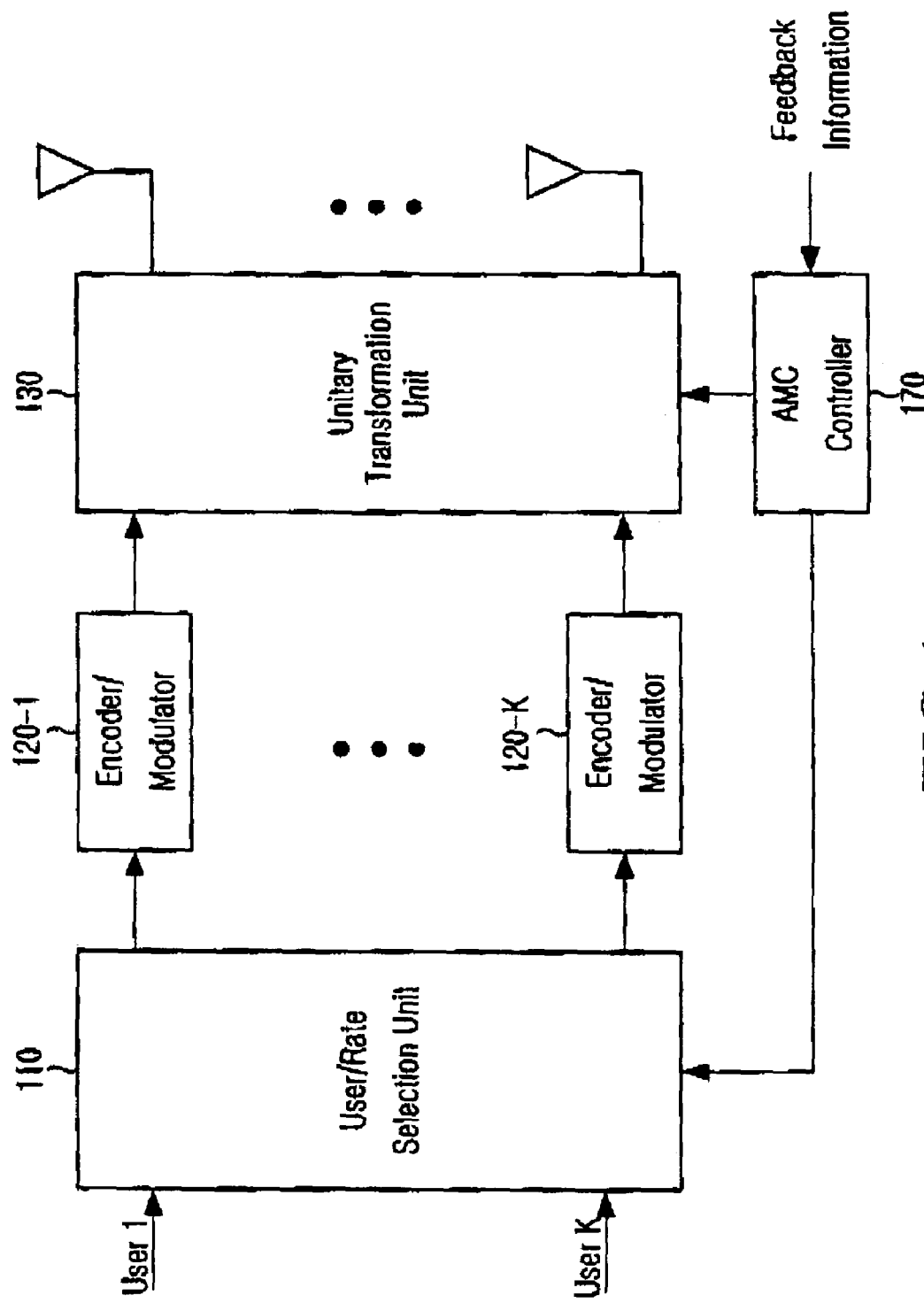
FIG. 1 is a block diagram illustrating a transmitter of a wireless communication system according to an embodiment of the present invention.

FIG. 1 is a block diagram illustrating a transmitter of a wireless communication system to which the feedback method of the present invention is adopted.

As shown in FIG. 1, the transmitter includes a user/rate selection unit (110) for selecting users to which incoming data be transmitted and data rates of the respective users based on the Adaptive Modulation and Coding (AMC) information provided by an AMC controller (170) which computes the AMC information using the feedback information from the terminals (not shown). The user/rate selection unit (110) outputs the data to be transmitted to the user terminals to corresponding encoder/modulator units (120-1, ..., 120-k) in parallel. The encoder/modulator units (120-1, ..., 120-k) perform encoding and modulation to the respective data and output the encoded/modulated signals to a unitary, transformation unit (130). The unitary transformation unit transforms the encoded/modulated signals according to the AMC information provided by the AMC controller (170) and the transmits the transformed signals through corresponding transmit antennas.

Consider a K user wireless downlink communications system with multiple transmit antennas at the base station, as shown in FIG. 1, and multiple receive antennas for each user.

It is assumed that the base station has M transmit antennas and the user k has $N_k$ receive antennas, noting that the number of receive antennas in the system is $N=\sum_{k=1}^{K} N_k$. Also, the channel is modeled as a frequency-flat block fading and additive white Gaussian noise channel. Interference from neighboring cells are modeled as additive Gaussian noise, as concentrating on the single cell model. The channel output of receiver k is given by $Y_k = H_k WX + Z_k$. The M×1 input signal vector x is transmitted by the base station and is constrained to have power no greater than a sum-power constraint P, i.e., $tr(E\{xx^H\}) \leq P$, W is a unitary transform matrix, and the M×1 vector $Z_k$ represents the random additive noise for user k where $Z_k \sim N(0, I)$. The channel Hk is a $N_k \times M$ complex matrix, whose entries are assumed to be independently and identically distributed (i.i.d.) zero-mean complex-Gaussian random variables, independent across antennas of all inter- and intra-users. Generally, the base station has the limited channel knowledge because of delayed lossy feedback signaling.

In one embodiment of the present invention, a Per-User Unitary Rate Control (PU2RC) with feedback and beamforming is adopted as the multiuser MIMO scheme. The beamforming using unitary transform matrix W that is a function of the channel unitary matrices fed back from users is employed at the transmitter. In FIG. 1, the generic schematic of PU2RC using unitary beamforming with a finite set in a predetermined way, where combining with, the user and beam selection leads to additional throughput improvement due to interference reduction between users. the amount of finite set of precoding matrices, and furthermore, applying a codebook design such as Grassmannian line packing to the finite set improves the throughput performance much further.

Feedback Scenario I—Full Feedback

The downlink transmission of the proposed multiuser precoding scheme is operated as follows. First each mobile user measures the received SNRs when the finite set of precoding matrices is used. Then the transmitter determines the best users for each transmit antenna based on the feedback information when $$k_{i,j} = \arg \max_{k \in \{1,2,\ldots,K\}} r_{k,i,j} \quad (1)$$

where $r_{k,i,j}$ is the received SNR fed back from the kth mobile user, i is the index of the precoding matrix, and j is the index of the column of the ith precoding matrix.

The full feedback can be summarized as follows:

Step 1. Each mobile user measures the received SNRs for all transmit antennas.

Step 2. Each mobile user feeds back each index of precoding matrix and its received SNRs.

Step 3. Transmitter determines the best users for each transmit antenna according to equation (1)

Step 4. Transmitter calculates the sum rate obtained with each precoding matrix.

Step 5. Transmitter decides the precoder and users for each transmit antenna to maximize the sum rate.

Assuming that M is 2 and the precoder is a 2×2 matrix with 2 candidate precoders in a finite set (as used in the numerical results next), the transmitter calculates the sum rate obtainable with each precoding matrix as follows.

$$c_1 = \sum_{j=1}^{2} c_f(r_{k_1,1,j}) \quad (2)$$

$$c_2 = \sum_{j=1}^{2} c_f(r_{k_2,2,j}) \quad (3)$$

Then, if $c_1 > c_2$, the transmitter determines $k_1 = k_{1,1}$ and $k_2 = k_{1,2}$, otherwise $k_1 = k_{2,1}$ and $k_2 = k_{2,2}$. The ith transmit antenna is assigned to $k_i$th mobile user (i=1,2) to send its data stream. Note that $C_f(g) = \log(1+g)$.

Feedback Scenario II—Compatible Feedback

In one embodiment of the present invention, a significant amount of feedback loading can be reduced, mainly because the selected precoding matrix is carried back to the transmitter, not all matrices as in full feedback signaling. Compatibility of feedback transmission is then maintained when compared with single-user MIMO systems. Using compatible feedback only one preceding matrix can be fed back with its received SNRs. There are two possible ways to determine the precoder. Firstly, each user measures all SNRs according to a finite set of preceding matrices. Selected is the precoder which has the highest SNR of some specific column vector. The chosen precoding matrix at the receiver is given by $$W_{CF1,k} = \arg \max_{i,j} r_{k,i,j} \quad (4)$$

Secondly, another possible way for compatible feedback of the kth user is to select the precoder matrix which achieve the maximum sum rate as $$W_{CF2,k} = \arg \max_{i} \sum_{j} c_f(r_{k,i,j}) \quad (5)$$

In Equations (4) and (5), feedback rate is the same for both cases. The compatible feedback can be summarized as follows:

Step 1. Each mobile user measures the received SNRs for all transmit antennas.

Step 2. Each mobile user feeds back the selected index of precoding matrix and its received SNRs according to (4) or (5).

Step 3. Transmitter determines the best users for each transmit antenna according to equation (1)

Step 4. Transmitter calculates the sum rate obtained with each precoding matrix.

Step 5. Transmitter decides the precoder and users for each transmit antenna to maximize the sum rate.

Feedback Scenario III—Reduced Feedback

To reduce the amount of feedback rate further, each user selects the column vector of recoding matrix which has the highest received SNR measured at the receiver, and hence feedback information is reduced down to the column vector with its SNR only. The selected column vector of the precoder is derived as given in (4). The only difference between the reduced feedback and compatible feedback is that in (4) all received SNRs with the chosen index of precoder are fed back to the transmitter, while using reduced feedback only a single SNR is transmitted back to the uplink.

The reduced feedback can be summarized as follows;

Step 1. Each mobile user measures the received SNRs for all transmit antennas.

Step 2. Each mobile user feeds back the column vector of the selected precoding matrix and its corresponding received SNR according to Equation (4).

Step 3. Transmitter determines the best users for each transmit antenna according to equation (1)

Step 4. Transmitter calculates the sum rate obtained with each precoding matrix.

Step 5. Transmitter decides the precoder and users for each transmit antenna to maximize the sum rate.

Figure 2:
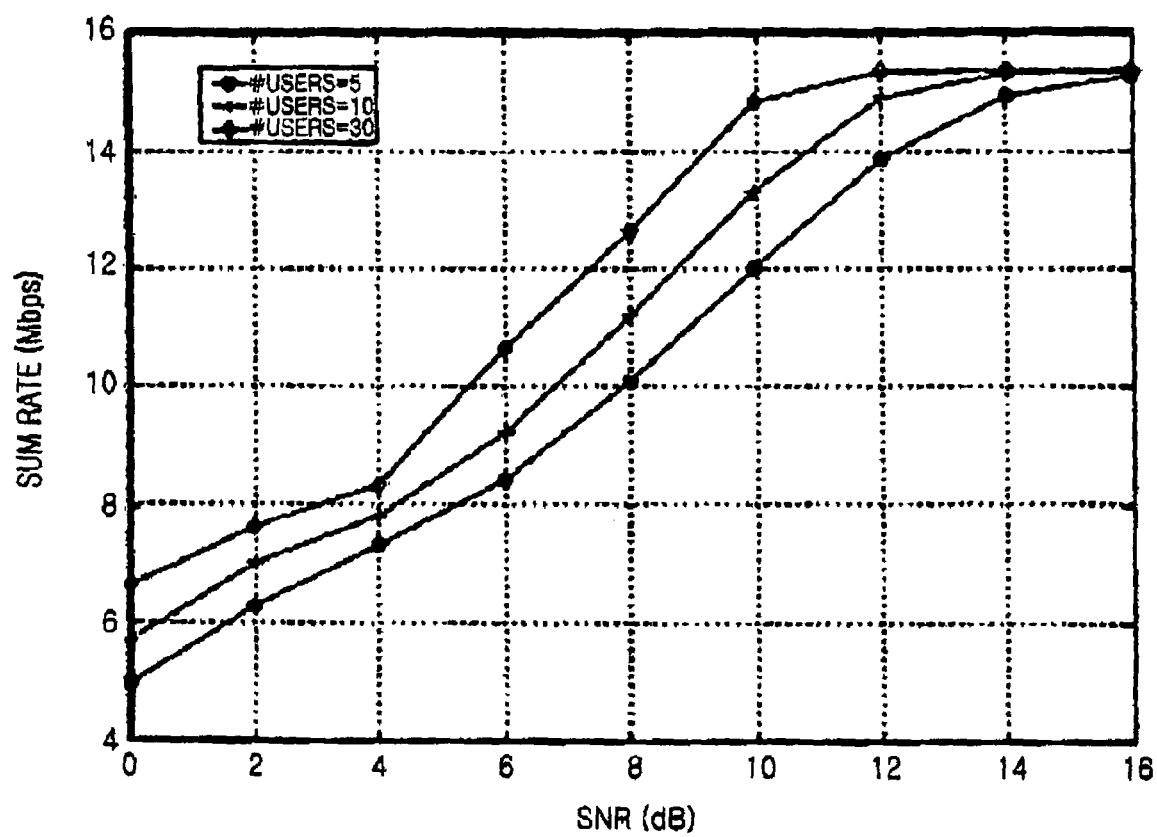
FIG. 2 is a graph showing sum rate performances of the MIMO technique (PU2RC) of the present invention with different numbers of users.

FIG. 2 is a graph showing sum rate performances of the MIMO technique (PU2RC) of the present invention with different numbers of users.

For the simulation, the number of precoding matrices in a finite set is two, which requires only one bit to feed back the chosen transmit precoder while SNRs are known perfectly at the transmitter. The user diversity gain is obtained as K increases, resulting in the sum rate performance enhancement. The sum rates with different number of users are converged when SNR gets high.

Figure 3:
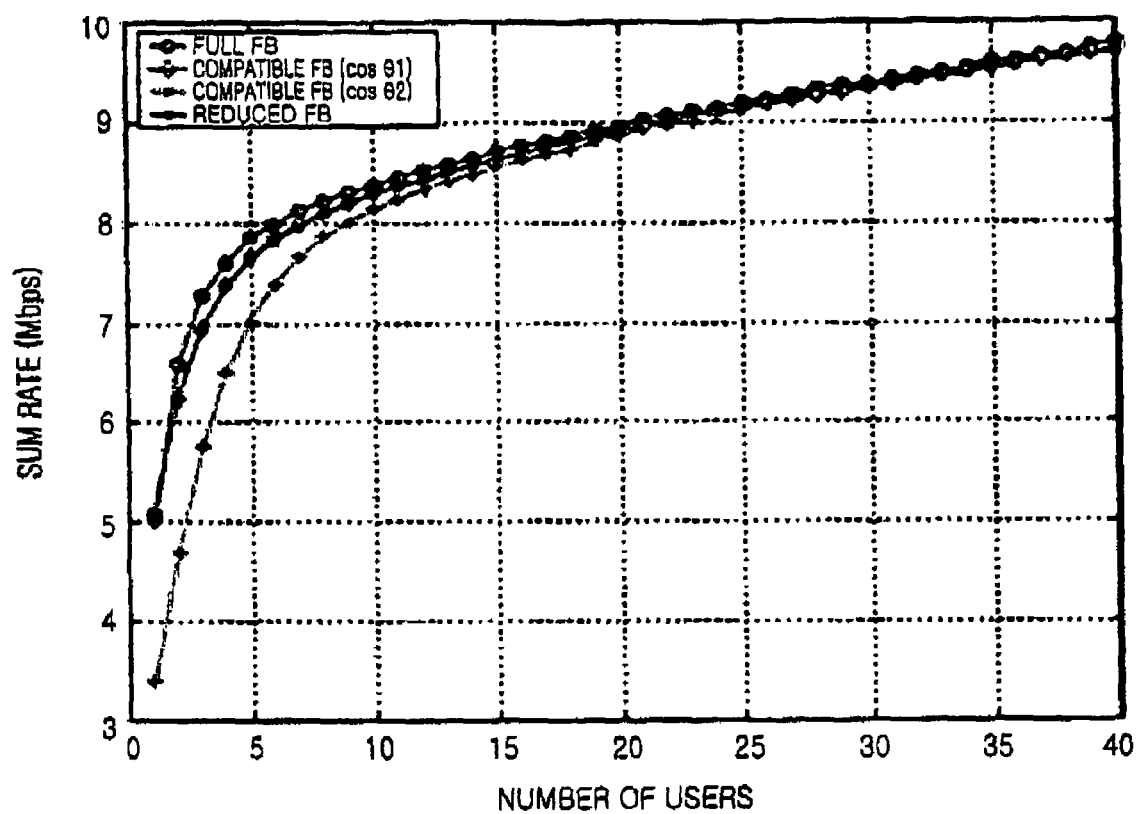
FIG. 3 is a graph showing sum rate performances with various feedback schemes according to the embodiments of the present invention.

FIG. 3 is a graph showing sum rate performances with various feedback methods according to the embodiments of the present invention.

As shown in FIG. 3, the sum rate performance curves of both the compatible and reduced feedback schemes become close to the sum rate performance curve of full feedback scheme when the number of users are reasonably large enough. Accordingly, the reduced feedback scheme can be the choice with minor performance degradation.

As described above, the feedback method of the present invention can reduce feedback information amount without degradation of the sum rate performance of the system since the feedback information is transmitted in a form of an index implying appropriate precoding matrix and corresponding SNRs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for transmitting data in multiuser Multiple-Input Multiple-Output (MIMO) systems in which a base station performs scheduling on the basis of feedback information received from a plurality of terminals, comprising:

determining, at the base station, at least one best terminal for each transmit antenna on the basis of the feedback information;

calculating a sum rate from the feedback information;

deciding a precoding matrix and terminals for each transmit antenna, maximizing the sum rate; and performing transmission with the decided precoding matrix and terminals;

wherein the best terminal for each antenna is determined by $$k_{i,j} = \arg \max_{k \in \{1,2,\ldots,K\}} r_{k,i,j},$$

where $r_{k,i,j}$ is a received Signal to Noise Ratio (SNR) of kth terminal, i is an index of the precoding matrix, and I is an index of a column of the precoding matrix.

2. The method of claim 1, wherein the feedback information includes all indexes of the precoding matrixes and received SNRs corresponding to the matrixes.

3. A method for transmitting data in multiuser Multiple-Input Multiple-Output (MIMO) systems in which a base station performs scheduling on the basis of feedback information received from a plurality of terminals, comprising:

determining, at the base station, at least one best terminal for each transmit antenna on the basis of the feedback information;

calculating a sum rate from the feedback information;

deciding a precoding matrix and terminals for each transmit antenna, maximizing the sum rate; and performing transmission with the decided precoding matrix and terminals;

wherein the precoding matrix is selected by $$W_{CF1,k} = \arg \max_{i,j} r_{k,i,j},$$

where $r_{k,i,j}$ is a received SNR of a kth terminal, i is an index of the precoding matrix, and j is an index of a column of the precoding matrix.

4. The method of claim 3, wherein the feedback information includes a single index of a precoding matrix chosen by the terminal and SNRs corresponding to the precoding matrix.

5. The method of claim 3, wherein the feedback information includes a column vector of a precoding matrix selected by the terminal and the received SNR corresponding to the column vector.

6. A method for transmitting data in multiuser Multiple-Input Multiple-Output (MIMO) systems in which a base station performs scheduling on the basis of feedback information received from a plurality of terminals, comprising:

determining, at the base station, at least one best terminal for each transmit antenna on the basis of the feedback information;

calculating a sum rate from the feedback information;

deciding a precoding matrix and terminals for each transmit antenna, maximizing the sum rate; and performing transmission with the decided precoding matrix and terminals;

wherein the precoding matrix is selected by $$W_{CF2,k} = \arg \max_{i} \sum_{j} c_f(r_{k,i,j}),$$

where $c_f$ feedback capacity, $r_{k,i,j}$ is a received SNR of kth terminal, i is an index of the precoding matrix, and j is an index of a column of the precoding matrix.

7. The method of claim 6, wherein the feedback information includes a single index of a precoding matrix chosen by the terminal and SNRs corresponding to the precoding matrix.

8. A method for feeding back information in multiuser Multiple-Input Multiple-Output (MIMO) system in which a base station determining at least one best terminal for each transmit antenna on the basis of feedback information, calculating a sum rate from the feedback information, deciding a precoding matrix and terminals for each transmit antenna, performing transmission with the decided precoding matrix and terminals, the method comprising:

measuring, at the terminal, received Signal to Noise Ratios (SNRs) for all transmit antennas;
selecting one of precoding matrixes, which has a best SNR;
retrieving an index mapped to the selected precoding matrix from a predetermined mapping table; and
transmitting the index with the SNRs of the selected precoding matrix;
wherein the precoding matrix is selected by $$W_{CF1,k} = \arg\max_{i,j} r_{k,i,j},$$

where $r_{k,i,j}$ is a received SNR of a kth terminal, i is the index of the precoding matrix, and j is the index of a column of the precoding matrix.

9. A method for feeding back information in multiuser Multiple-Input Multiple-Output (MIMO) system in which a base station determining at least one best terminal for each transmit antenna on the basis of feedback information, calculating a sum rate from the feedback information, deciding a precoding matrix and terminals for each transmit antenna, performing transmission with the decided precoding matrix and terminals, the method comprising:
measuring at the terminal received Signal to Noise Ratios SNRs for all transmit antennas;
selecting one of precoding matrixes, which has a best SNR;
retrieving an index mapped to the selected precoding matrix from a predetermined mapping table; and
transmitting the index with the SNRs of the selected precoding matrix;
wherein the precoding matrix is selected by $$W_{CF1,k} = \arg\max_{i,j} r_{k,i,j},$$

where $c_f$ is feedback capacity, $r_{k,i,j}$ is a received SNR of a kth terminal, i is the index of the precoding matrix, and j is an index of a column of the precoding matrix.

10. A method for feeding back information of multiuser Multiple-Input Multiple-Output (MIMO) system in which a base station determining at least one best terminal for each transmit antenna on the basis of feedback information, calculating a sum rate from the feedback information, deciding a precoding matrix and terminals for each transmit antenna, performing transmission with the decided precoding matrix and terminals, the method comprising:
measuring, at the terminal, received Signal to Noise Ratios (SNRs) for all transmit antennas;
selecting one of precoding matrixes, which has best SNRs;
extracting one of column vectors constituting the selected precoding matrix;
retrieving an index mapped to the selected precoding matrix from a predetermined mapping table; and
transmitting the index with information on the retrieved column vector and the SNRs corresponding to the column vector to the base station;
wherein the precoding matrix is selected by $$W_{CF1,k} = \arg\max_{i,j} r_{k,i,j},$$

where $r_{k,i,j}$ is a received SNR of a kth terminal, i is the index of the precoding matrix, and j is an index of a column of the precoding matrix.

11. A method for feeding back information of multiuser Multiple-Input Multiple-Output (MIMO) system in which a base station determining at least one best terminal for each transmit antenna on the basis of feedback information, calculating a sum rate from the feedback information, deciding a precoding matrix and terminals for each transmit antenna, performing transmission with the decided precoding matrix and terminals, the method comprising:
measuring, at the terminal, received Signal to Noise Ratios (SNRs) for all transmit antennas;
selecting one of precoding matrixes having a best SNR;
extracting one of column vectors constituting the selected precoding matrix;
retrieving an index mapped to the selected precoding matrix, column vector, and SNR corresponding to the column vector of the selected precoding matrix from a predetermined mapping table; and
transmitting the index as the feedback information to the base station;
wherein the precoding matrix is selected by $$W_{CF1,k} = \arg\max_{i,j} r_{k,i,j},$$

where $r_{k,i,j}$ is a received SNR of a kth terminal, i is the index of precoding matrix, and j is the index of a column of the precoding matrix.

* * * * *

UNITED STATES PATENT AND TRADEMARK OFFICE
CERTIFICATE OF CORRECTION

PATENT NO. : 7,587,172 B2  Page 1 of 1
APPLICATION NO. : 11/368726
DATED : September 8, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 733 days.

Signed and Sealed this

Twenty-first Day of September, 2010

David J. Kappos
*Director of the United States Patent and Trademark Office*